United States Patent
Maykov et al.

(10) Patent No.: US 8,424,004 B2
(45) Date of Patent: Apr. 16, 2013

(54) HIGH PERFORMANCE SCRIPT BEHAVIOR DETECTION THROUGH BROWSER SHIMMING

(75) Inventors: Alexey Maykov, Redmond, WA (US); Kumar H Chellapilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1208 days.

(21) Appl. No.: 11/767,486

(22) Filed: Jun. 23, 2007

(65) Prior Publication Data

US 2008/0320498 A1    Dec. 25, 2008

(51) Int. Cl.
*G06F 9/46*       (2006.01)
*G06F 3/00*       (2006.01)

(52) U.S. Cl.
USPC .......................................... 718/101; 719/320

(58) Field of Classification Search .................... 719/320
See application file for complete search history.

(56) References Cited

U.S. PATENT DOCUMENTS

| | | | |
|---|---|---|---|
| 6,230,114 B1 * | 5/2001 | Hellestrand et al. ............ | 703/13 |
| 6,651,241 B1 | 11/2003 | Hernandez, III | |
| 6,988,100 B2 | 1/2006 | Jackson et al. | |
| 6,996,845 B1 * | 2/2006 | Hurst et al. ...................... | 726/25 |
| 7,287,279 B2 * | 10/2007 | Bertman et al. ................ | 726/23 |
| 7,363,610 B2 * | 4/2008 | Alfieri ........................... | 716/103 |
| 7,587,667 B2 * | 9/2009 | Scardina et al. .............. | 715/230 |
| 7,765,597 B2 * | 7/2010 | Sima et al. ...................... | 726/25 |
| 2003/0105958 A1 | 6/2003 | McArdle | |
| 2003/0236577 A1 | 12/2003 | Clinton | |
| 2004/0177327 A1 | 9/2004 | Kieffer | |
| 2005/0015512 A1 | 1/2005 | Kale et al. | |
| 2005/0076344 A1 | 4/2005 | Goring et al. | |
| 2006/0190561 A1 * | 8/2006 | Conboy et al. ................ | 709/217 |
| 2007/0113282 A1 * | 5/2007 | Ross ............................... | 726/22 |

OTHER PUBLICATIONS

Chellapilla, et al., "A Taxonomy of JavaScript Redirection Spam", May 8, 2007, ACM Press, 2007, pp. 8.
"The Ultimate JavaScript Client Sniffer, Version 3.03: Determining Browser Vendor, Version, and Operating System With JavaScript", retrieved at <<http://www.mozilla.org/docs/web-developer/sniffer/browser_type.html>> Netscape Communications Corporation, 1999-2001, pp. 1-19.
"Unobtrusive IFrame Shim—A Half Solution", retrieved at <<http://blog.codefront.net/category/javascript/>>, Aug. 1, 2006, pp. 1- 5.

* cited by examiner

*Primary Examiner* — Meng An
*Assistant Examiner* — Wissam Rashid (57) ABSTRACT

The behavior of browser applications, such as web browsers, can be controlled in part by script-based instructions present within documents read by those browsers. To analyze such scripts in an efficient manner, a script analyzer can identify the scripts in the document, divide them into script modules, and order the modules to represent an interpretational flow. The script can be interpreted and executed on a line-by-line basis and its behavior analyzed. Prior to interpretation, the scripts can be reviewed for delay conditionals, and such statements can be modified for more efficient interpretation. Additionally, if, during interpretation, the script generates new script, or modifies existing script, such new scripts can be themselves interpreted. External function calls made by the script can be intercepted and responded to in a generic fashion, limiting the need to create a document object model, based on the document's data, solely for script analysis purposes.

18 Claims, 6 Drawing Sheets

HIGH PERFORMANCE SCRIPT BEHAVIOR DETECTION THROUGH BROWSER SHIMMING

BACKGROUND

The core of the World Wide Web (WWW) comprises several billion interlinked web pages. Accessing information on almost any of these web pages would be essentially impossible without the aid of systems that enable a user to search for specific text, or textual identifiers. Indeed, such systems, generally known as "search engines," have increased in popularity as the WWW has grown in size.

Traditionally, a search engine comprises an initial page providing the user with a mechanism for entering one or more words, characters, or phrases, known as the "search string" or the user's "query." The search string represents the words, characters or phrases that the user wishes to find in one or more of the web pages that comprise the WWW. The search engine will then reference a database comprising the content of a myriad of web pages, seeking to identify one or more web pages that contain the search string that the user entered. More advanced search engines can also apply common linguistic permutations to the words or phrases that the user is searching for in an effort to provide a more complete result. Thus, if the user searched for the word "computers," the search engine could also search for the singular form "computer," or even the verb form "computing," so as not to exclude, for example, a web page referencing a single "computer" but not multiple "computers."

To generate a database which can be searched for the user's search string, search engines commonly employ automated processes known as "crawlers" to read information from a web page, follow the links in the web page to other web pages, read information from those web pages, and so forth. In such a manner, the crawler traverses web pages of the WWW in an orderly manner, returning the information from the web page back to the search engine for storage. The search engine then stores the information in an optimized format to reduce the amount of storage space used, and to improve searching efficiency.

Due to the sheer volume of information and content available on the WWW, all but the most obscure search strings can result in thousands, and even millions of web pages identified by the search engine as comprising the entered search string. Generally, most users will only review the first few results, continuing beyond those only if they were not able to find anything in those first few results that was of interest to them. Consequently, search engines generally display search results such that the results with the highest ranking appear near the beginning of the listing. The web pages that are displayed near the beginning of a search result listing are, therefore, most likely to have visitors directed to them from the search engine.

Because an increased number of visitors can provide benefits, both financial and otherwise, having web pages listed near the beginning of a search result listing can be desirable. However, because the content that may cause a web page to be highly ranked can differ from the content that a web page author would wish to present to visitors, a first web page can be designed to be ranked highly by a search engine and to be relevant to a wide range of queries. However, when actually browsed to by a browser, that first web page could instead direct the browser to display a second web page whose content need not be limited to that which will receive a high ranking. Indeed, the second web page may even comprise inappropriate or malicious content which would have been excluded by the search engine. Additionally, the first and second web pages do not need to share a common heritage, nor do such links need to be made in advance. For example, the author of a page that has become highly ranked could sell redirections from that page to multiple other web page authors, such that visitors to the first page are redirected randomly to the web pages of those other web page authors.

To maintain accuracy, search engines can attempt to detect if one web page will redirect to another. Such redirections may not always be inappropriate or malicious. For example, redirections can be used to automatically direct visitors to equivalent content, except presented in the visitor's native language. Similarly, redirection can also be used to achieve load balancing, thereby providing visitors with the same content, except in a more responsive manner. Thus, in addition to merely detecting if one web page will redirect to another, search engines can also attempt to determine the content of the redirected page. If appropriate, the search engine can index, not the content of the first web page, which will never be seen by a user browsing there anyway, but rather the content of the page that is the target of the redirection. By indexing such content, however, the search engine can effectively nullify the redirection. To avoid having the search engine detect that one web page redirects to another web page, a web page author can utilize various script-based mechanisms which cannot be easily, or efficiently, detected by a search engine.

SUMMARY

Web page scripts can cause a browser to perform a wide variety of actions and, consequently, determining the end result of one or more scripts based only on the scripts' text can be very difficult. Interpreting and executing the scripts in a browser provides one mechanism by which the precise functionality of the scripts can be evaluated, but a great deal of computing resources would be required to evaluate all of the scripts detected by a search engine crawler. In one embodiment, the scripts of a web page can be interpreted and executed while intercepting all of the scripts' requests made to the browser. The intercepted requests can be evaluated and, in certain circumstances, the relevant behavior of the script can be detected merely from such an evaluation. If further information regarding the behavior of the script is desired, a generic response, such as a "succeeded" response, can be provided without actually performing the requested function. The relevant behavior of the script may then be detected by its subsequent operation. If still further information regarding the behavior of the script is desired, or if the generic response was not, or would not be, successful in causing the scripts' execution to proceed, the request can be properly responded to by requesting a browser to construct a Document Object Model (DOM) of the page comprising the scripts, and then referencing the DOM to respond to the request.

The browser used to generate the DOM can, in one embodiment, be a traditional web browser. In an alternative embodiment, the web browser used can be a reduced functionality browser having, for example, no display component, or a browser designed for a limited computing environment. In a further alternative embodiment, the browser used to generate the DOM can implement only a small subset of the functionality of a traditional web browser, including implementing only commonly used methods and commonly referenced properties.

In a further embodiment, multiple passes can be performed if it is determined in one pass that the scripts generated additional scripts, or modified currently existing scripts. A subsequent pass can, thereby, evaluate the newly added or changed script.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to a determination, in an efficient manner, of the end result of the one or more scripts in a container document. The mechanisms described are designed to be capable of implementation with large numbers of both containers and scripts. Obtained scripts are first identified and extracted from a host container and are subsequently interpreted and executed. During such interpretation and execution, requests from the scripts are responded to in a generic manner and further processing of the host container is undertaken if such generic responses are inadequate for the intended analysis. Further processing of the host container can be performed by lightweight browser software, including browsers designed for more limited computing devices and customized browsers or browser components. Multi-pass interpretation can occur if the execution of the scripts results in the modification of pre-existing scripts, or the addition of new scripts The techniques described herein focus on, but are not limited to, the analysis of scripts, specifically JavaScript, within the context of web pages, and specifically for the purpose of determining if the scripts are designed to redirect a browser to a second web page. However, none of the below described mechanisms rely on any aspect or functionality of JavaScript, or web pages in general that cannot be found in almost any other scripting language or suitable container. For example, the below descriptions are equally applicable to Visual Basic® scripts provided within the context of a word processing or spreadsheet document. Similarly, none of the below described analysis is applicable only to the detection of redirection functionality and, indeed, the below descriptions are equally applicable to the detection of any type of script behavior that may be of interest. Consequently, while the below descriptions will refer to "web pages" and "web browsers", and will focus on the detection of redirection behavior, the usage of such terms is exemplary only, and the descriptions are not meant to be so limited.

Figure 1:
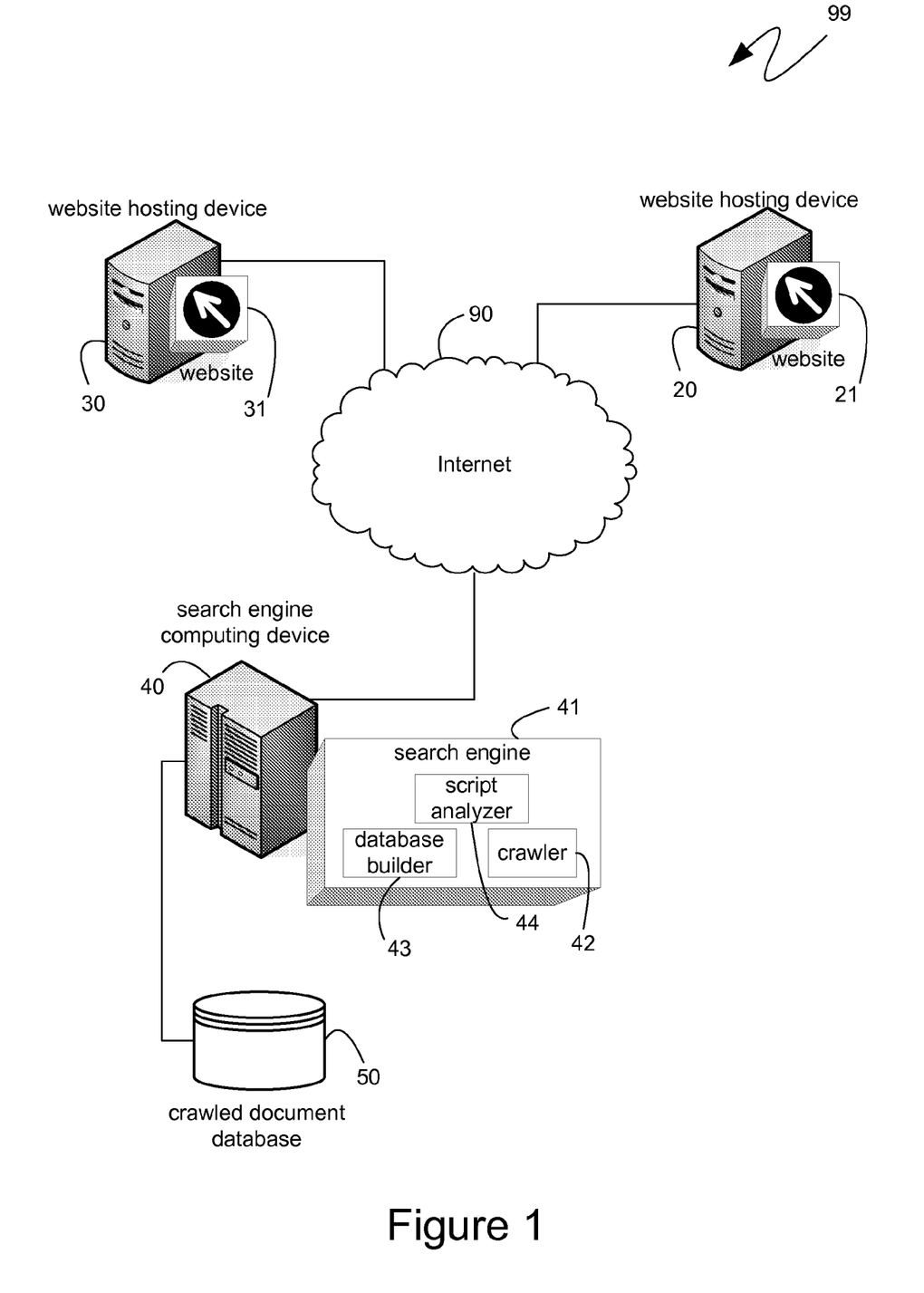
FIG. 1 is a diagram of an exemplary system that provides context for the described functionality.

Turning to FIG. 1, an exemplary system 99 is illustrated, providing context for the descriptions below. The exemplary system 99 can illustrate part of the Internet 90, as shown, though the reference to the Internet is strictly an example and is not intended to limit the descriptions to Internet protocols, such as the Transmission Control Protocol (TCP), the Internet Protocol (IP), or any other Internet-specific technology. Exemplary system 99 comprises three computing devices that can be considered part of the Internet 90, including website hosting computing devices 20 and 30 and search engine computing device 40. Each of the website hosting devices 20 and 30 can host a website 21 and 31, respectively, which can be viewed by a user through a web browser. More precisely, each of the websites 21 and 31 can comprise one or more web pages that can be read and displayed by a web browser. As will be known by those skilled in the art, the collection of websites hosted by computing devices connected to the Internet 90 is commonly referred to as the World Wide Web. However, as with the reference to the Internet itself, the reference to the World Wide Web is strictly exemplary and is not intended to limit the descriptions to HTTP, HTML, or any other World Wide Web-specific technology.

The search engine computing device 40 of FIG. 1 hosts a search engine 41, which can comprise a number of interrelated components, including one or more crawlers, such as crawler 42, an database builder 43 and a script analyzer 44. The crawler 42 can request and obtain data from a page, such as a web page that is part of website 21 or 31. The crawler can, from the web page data received, identify links that are contained on that page, and then follow one or more of those links to other pages. Collecting the data from those other pages, the crawler 42 can continue in such a manner indefinitely.

The information gathered by crawler 42 can be returned to the search engine 41, where it can be used by the database builder 43, or similar component, to create or update an appropriately structured database, such as the crawled document database 50. In one embodiment, the database builder 43 aggregates the information from multiple pages into storage elements that are stored in the database 50. The aggregated information includes, not only the information from the pages themselves, but also metadata, including, for example, the date on which the page's data was obtained. The database builder 43 can store web page information in the crawled document database 50 in such a manner that those web pages, whose stored information matches one or more predefined criteria, can be efficiently identified.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
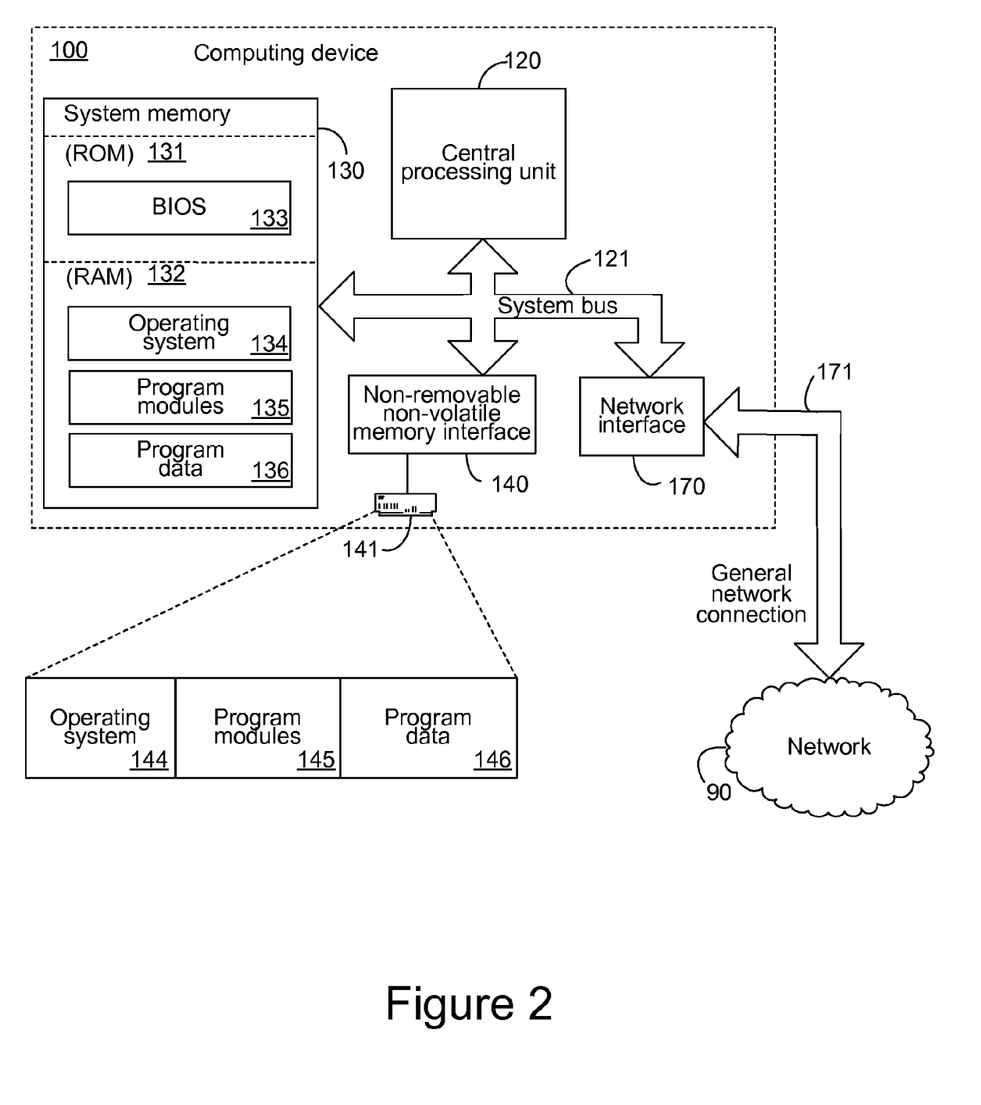
FIG. 2 is a block diagram of an exemplary computing device.

With reference to FIG. 2, an exemplary computing device 100 is illustrated. The computing device 100 can represent any of the computing devices 20, 30 or 40 of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
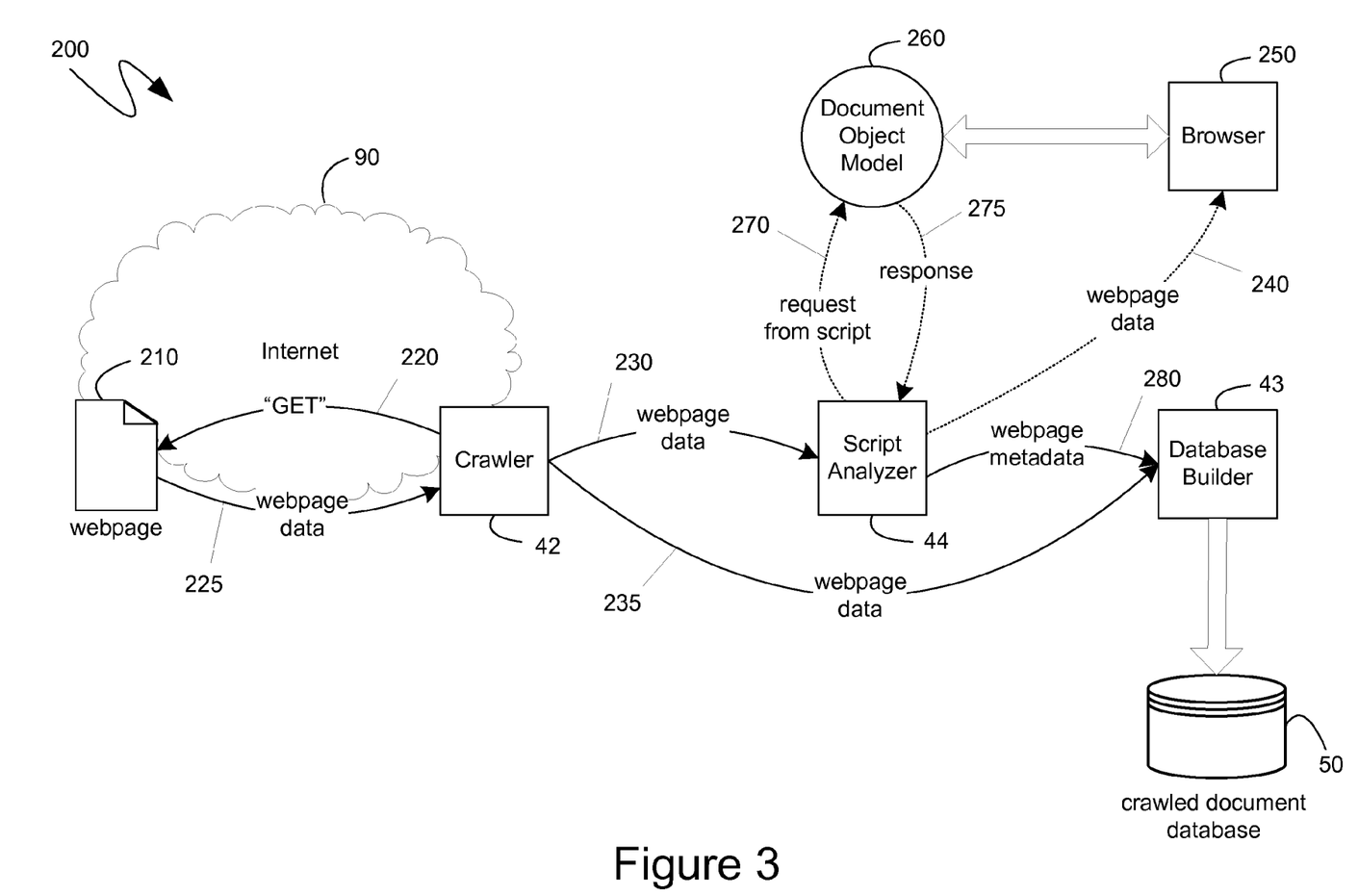
FIG. 3 is a block diagram illustrating an exemplary communicational flow associated with a search engine.

Once a communications link has been established between the search engine computing device 40 and any of the website hosting computing devices connected to the Internet 90, such as website hosting computer devices 20 and 30, data from the web pages that comprise the hosted websites, such as websites 21 and 31, respectively, can be downloaded by the crawler 42 to the search engine 41. Turning to FIG. 3, a block diagram 200 illustrates the downloading of such web page data, and an exemplary processing that can be performed by the search engine 41 upon receiving such data. Thus, as indicated in FIG. 3, the crawler 42 can issue a request 220, such as the illustrated Hyper-Text Transfer Protocol (HTTP) GET request, to the website hosting a web page 210. In response, the web page data can be provided to the crawler 42, as illustrated by communication 225.

Once the crawler 42 has received the web page data via communication 225, the crawler can use such data to identify further web pages that the crawler can subsequently visit and request information from those web pages in a manner similar to that represented by communications 220 and 225. The crawler 42 can also provide the webpage data to the script analyzer 44 and the database builder 43, via communications 230 and 235, respectively. The database builder 43 can, from the web page data received via communication 235, update the crawled document database 50 with information relevant to the search engine 41.

The information stored by the database builder 43 in the crawled document database 50 can be influenced by web page metadata provided to the database builder from the script analyzer 44 via communication 280. As will be described further below, the metadata transmitted via communication 280 can comprise information regarding the behavior of any scripts contained within the web page 210. For example, the metadata provided by the script analyzer 44 can indicate that the web page 210 comprises one or more scripts that act to automatically redirect visitors to a different web page. In such a case, the database builder 43 can use such web page metadata to decide to index, not the data of the web page 210, but rather the data of the web page to which web page 210 redirects. However, the ultimate decision made by the database builder 43 based on the web page metadata received from the script analyzer 44 is irrelevant to the script analysis performed by the script analyzer. Thus, the below described analysis mechanisms can analyze the performance of any scripts in the web page 210 irrespective of whether such analysis may affect the operation of the database builder 43 or the contents of the crawled document database 50.

The script analyzer 44, as will be described further below, can utilize various mechanisms to analyze any scripts contained within the web page data received via communication 230 from the crawler 42. On occasion, the analysis of scripts may require the script analyzer to be able to provide a response to an external request made by one of the scripts. While the script analyzer can attempt to limit such occasions, such as via the techniques described below, should such a need occur, the script analyzer can utilize a Document Object Model (DOM) 260 to provide a response 275 to a request 270 from one or more of the scripts being analyzed.

As will be known by those skilled in the art, the DOM 260 represents the data from the web page 210 as organized and correlated by a browser, such as browser 250. By building a DOM 260, the browser 250 can perform a number of common operations more efficiently. For example, by first building a DOM 260, the browser 250 can dynamically re-render the display of the web page 210 should the size of the display area change.

Scripts contained within the web page 210 can perform functions with respect to the DOM 250 and can request information regarding the DOM. For example, the DOM 260 can comprise a window object that represents the browser's window displaying the web page 210. A script of the web page 210 can modify the window object, including, for example, requesting that the window be resized, or requesting that the window display a different web page. As will be described below, many such commands and requests can be responded to by the script analyzer 44 itself, without requiring the browser 250 to construct the DOM 260. However, some commands may require reference to the DOM 260. For example, a script requesting the relationship between two DOM objects may not be able to be responded to properly without building the DOM 260. In such a case, the script analyzer 44 can provide the web page data to the browser 250 via communication 240, and request that the browser generate the DOM 260 from the data. Once the DOM 260 is generated, the script analyzer 44 can reference the DOM when it receives a request 270 from a script that it is evaluating, and can thereby provide an accurate response 275 to the script.

In one embodiment, the browser 250 can be a standard web browser, such as one that supports most, if not all, of the protocols and languages commonly found in web pages. In an alternative embodiment, however, the browser 250 can be a reduced functionality browser that can more efficiently generate the DOM 260. One such reduced functionality browser can be a browser designed for a more limited computing platform. For example, modern cellular communication devices, personal digital assistants and pocketable computing devices often are equipped with a rudimentary browser that operates with minimal amount of computing resources, including processing capabilities and memory storage. Such browsers can, nevertheless, provide sufficient functionality to construct a DOM 260, or at least enough of a DOM to enable the script analyzer 44 to obtain a response 275 for the request 270. By using such a browser as the browser 250, the computing resources of the search engine computing device 40 can be more efficiently utilized when performing script analysis. For example, a standard web browser can consume several megabytes of active memory and several seconds of processing time to generate even a single DOM 260. A browser designed for a more limited platform may consume only a few hundred kilobytes of active memory and may be able to generate a DOM 260 in less than a second with an advanced processor, such as would be traditionally present in the search engine computing device 40.

Another reduced functionality browser that can be used as the browser 250 can be a standard web browser that has been modified to remove or deactivate most or all of the components of such a browser that are not directly relevant to the generation of the DOM 260. For example, components for generating the display of the web page 210 can be removed or deactivated, since the DOM 260 is being built, not to display the web page to a user, but rather to provide information that may be necessary to generate response 275. Similarly, in interpreting the web page 210, the browser 250 can be modified to avoid instantiating any plug-ins or like components, such as file viewers and animation generators.

In another embodiment, rather than using a standard or reduced functionality browser, a customized browser-like component can be used that can support some portion of the methods and properties commonly supported by a browser 250 to generate a DOM 260. For example, such a browser-like component can implement a window object, a document object and a location object, and similar core objects, but need not implement approximately half of the objects that would otherwise be implemented in a standard browser.

As indicated, the script analyzer 44 can implement script analysis mechanisms that can avoid requiring the creation of a DOM 260 in the first place. Thus, for a vast majority of the web pages obtained by the crawler 42, such as the web page 210, the script analyzer 44 may not ever require the creation of a DOM, such as DOM 260. For such a web page, the DOM 260 corresponding to that web page would not be needed and the communications 240, 270 and 275 would not exist. Instead, the analysis of any script in such a web page could be performed by the script analyzer 44 by itself.

Figure 4:
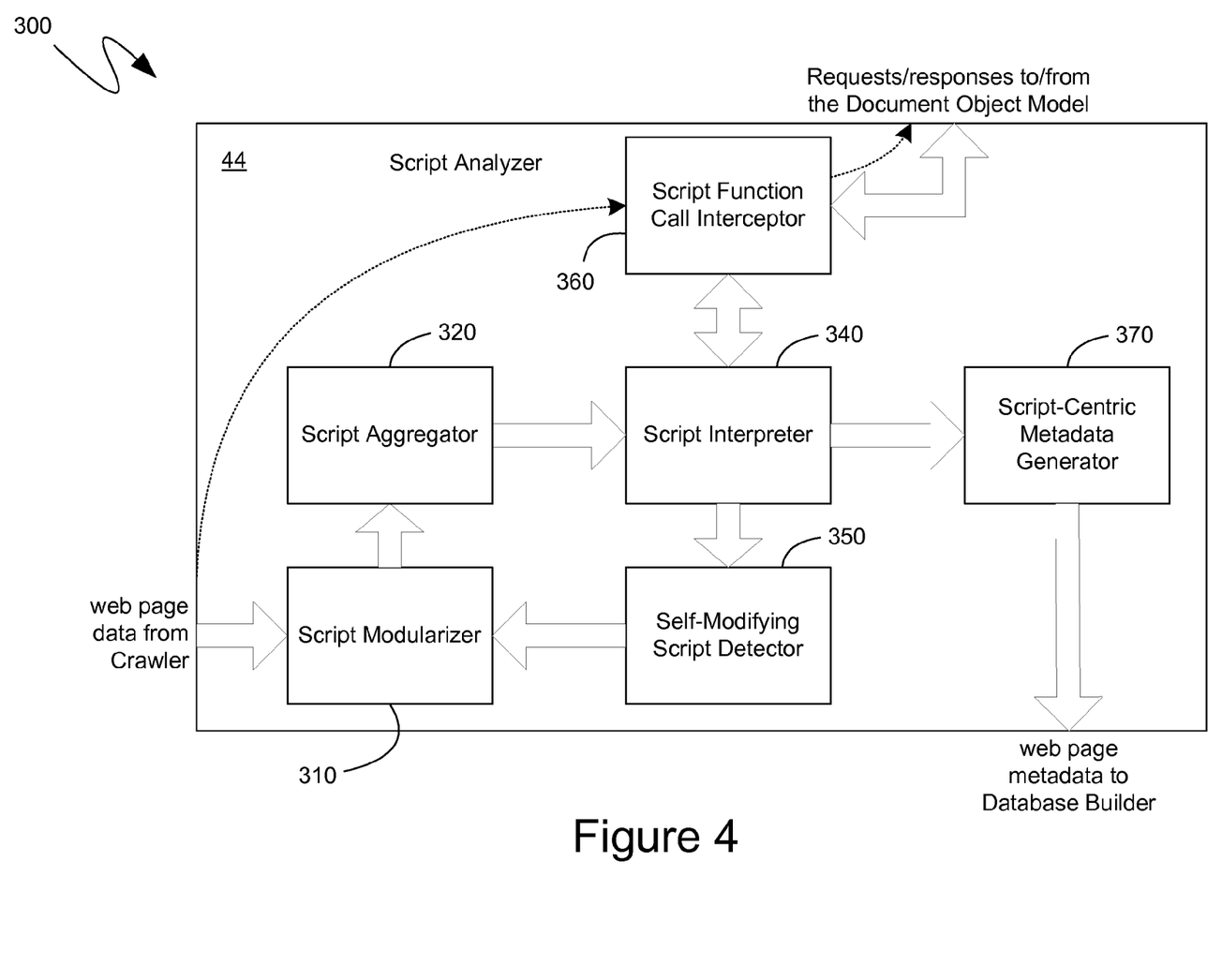
FIG. 4 is a block diagram illustrating an exemplary process flow within a script analysis component.

Turning to FIG. 4, block diagram 300 illustrates the script analyzer 44, some components thereof, and the inbound and outbound communications. In one embodiment, the script analyzer 44 can initially receive web page data from the crawler 42 at the script modularizer component 310. The script modularizer can parse the web page data to identify and separate out into modules any scripts contained within the web page data. For example, the script modularizer 310 can separate out and modularize scripts that are explicitly identified using an appropriate tag, such as the HyperText Markup Langauge (HTML)<SCRIPT> tag. The script modularizer 310 can further separate out and modularize scripts that may be embedded as attributes of other tags, scripts that may be incorporated into the web page via the HTML <META> tag, or scripts that may reside inside event handlers for events such as "OnClick" and "OnMouseMove." The script modules created by the script modularizer 310 can comprise pointers back to their original location within the web page data. Such a pointer can aid the script aggregator 320 in assembling the script modules into a series which can ultimately be provided to the script interpreter 340

Once the script modularizer 310 has completed creating script modules from the scripts in the web page being analyzed, it can provide those script modules to the script aggregator 320. The script aggregator 320 can, based on the original location of the scripts within the web page and their instructions, link together the various script modules into a series that can be interpreted and executed. Once linked, the scripts can be provided to the script interpreter 340 for interpretation and execution. In one embodiment, the script interpreter 340 can be a script interpretation component of a standard web browser. In such a case, the script interpreter 340 can be invoked by the script analyzer 44 in an analogous manner to the instantiation of a script interpreter component by a host web browser. To enable the interception of external function calls made by script that is being interpreted by the script interpreter 340, the script analyzer 44 can provide the address of the script function call interceptor 360 as the address of the browser when invoking the script interpreter 340. Consequently, instead of directing the script's requests to the browser as intended, the script interpreter 340 would direct such requests to the script function call interceptor 360, enabling the script function call interceptor to deal with the requests in a more efficient manner, as will be described below.

In an alternative embodiment, the script interpreter 340 can be a customized script interpreter written specifically to interpret scripts within the context of the script analyzer 44. Such a customized script interpreter 340 can be specifically designed to direct external function calls, made by the interpreted script, to the script function call interceptor 360. Additionally, such a customized script interpreter 340 can be optimized for the particular scripting behavior that may be of interest and can, therefore, be designed to avoid interpreting specific scripting instructions that may not be relevant to the behavior of interest.

In one embodiment, the scripts from the script modules are provided to the script interpreter 340 one line at a time, thereby enabling the script analyzer 44 to maintain control of the interpretation and execution of the scripts. As each line is interpreted and executed, an evaluation can be made whether to proceed with subsequent lines. Such a determination can be based on the particular behavioral aspect for which the scripts were being analyzed. For example, if the script analyzer 44 is attempting to determine if the scripts redirect a browser visiting web page 210 to a different web page, then, if the script interpreter 340 interprets and executes a line of script that attempts to change the location property of the window object to a different web page, the script analyzer 44 can stop the analysis since such an attempt can be considered a definitive indication that the script does indeed redirect the browser to another web page.

If the previously interpreted and executed script did not provide sufficient information to the script analyzer 44 regarding the overall objective of the scripts, a subsequent line of script can be provided to the script interpreter 340. While interpreting the script modules, the script interpreter 340 can interpret and execute scripts that request information from the DOM 260, the browser 250, or seek to modify the DOM 260. Such requests can be in the form of external function calls made by the scripts. However, as indicated previously, the creation of a DOM 260 can be computationally expensive. Consequently, rather than directing such requests to a browser 250 or DOM 260, the script interpreter 340 can instead direct such requests to the script function call interceptor 360. The script function call interceptor 360 can determine whether to provide a generic response to the external function call received, or whether to pass along the request to the browser 250 or DOM 260.

In one embodiment, the script function call interceptor 360 can, whenever possible, attempt to provide a generic response to external function calls received from the script interpreter 340. One such generic response can be a response indicating that, whatever request was made, its performance was successful. Such a success response can enable the interpretation and execution of the scripts to proceed, and thereby possibly provide further information regarding the scripts' objective. Another generic response can be the provision of a random response to commonly requested data, such as the current time, or the screen location of the user's cursor. Ultimately, the script function call interceptor 360 can attempt to have the interpretation and execution of the scripts continue, such that the overall objective of the scripts can be determined, without requiring a browser 250 to construct a DOM 260 to respond to the requests.

In another embodiment, the script function call interceptor 360 can recognize time-centric function calls and can attempt to respond to such calls in a manner that can avoid execution delay. For example, a script may delay execution until a specific time or event, or pending a specific period of time. Such delays can be set through mechanisms such as the "Set-Timeout" property of a document object. The script function call interceptor 360 can detect such time-centric function calls and can signal that the set time has already arrived, or otherwise attempt to return execution to the scripts as soon as possible. For example, the script function call interceptor 360 could, instead of waiting as requested by the script, instead provide a response to the script immediately, forcing the script to continue execution.

If the script function call interceptor 360 receives a request that it cannot itself handle in a meaningful manner, it can request that the browser 250 construct the DOM 260 by passing the web page data to the browser. For example, requests directed to relationships between various DOM elements, or the state of a specific DOM element, may require the construction of the DOM 260 in order to be properly responded to. Once the browser 250 has constructed the DOM 260, the script function call interceptor 360 can forward the request it originally received, thereby acting as a proxy for the script interpreter 340. Likewise, upon receiving response 275, the script function call interceptor 360 can provide that response to the script interpreter 340.

One external function call that can be made by scripts being interpreted by the script interpreter 340 is a request to write additional script into the web page instance that would be maintained by a browser. In such a case, a self-modifying script detector 350 can cause the newly added script, or newly modified script, to be interpreted a subsequent time by providing the newly added or modified script back to the script modularizer 310. For example, the scripts present in the web page data that are identified by the script modularizer 310 may not directly attempt to redirect a web browser rendering the web page to another, different web page. Instead, such scripts may instead merely generate additional script, and that subsequently generated script can then redirect the browser. When viewed by a user in a common web browsing session, such multiple layers of scripts could appear seamless in their redirection of the browser. However, when analyzing the scripts on a line-by-line basis, such redirection may not be detected unless the newly generated script is likewise interpreted and executed by the script interpreter 340. Consequently, the self-modifying script detector 350 can monitor the interpretation and execution of scripts by the script interpreter 340 and can detect when a script causes additional script to be generated, or modifies existing script. In such a case, the self-modifying script detector can, either at that time, or upon completion of the current round of interpretation, notify the script modularizer and provide the newly added or modified script. The interpretation and execution of the newly modified or added script can then proceed in the manner described above.

Upon completion or termination of the interpretation and execution of the scripts in the web page 220, the script-centric metadata generator 370 can generate information regarding the webpage 220 and provide such information to the database builder 43. Specifically, the script-centric metadata generator 370 can provide to the database builder information regarding the behavior of the scripts, including, for example, whether the scripts cause the web page 220 to redirect a browser to another web page and, if such redirection occurs, the address of the redirection target web page. Upon provision of the script-centric web page metadata, the analysis of the scripts in a web page 220 by the script analyzer 44 can end, and an analysis of any scripts found in the web page data of a subsequent web page can commence using the same mechanisms described above.

Figure 5:
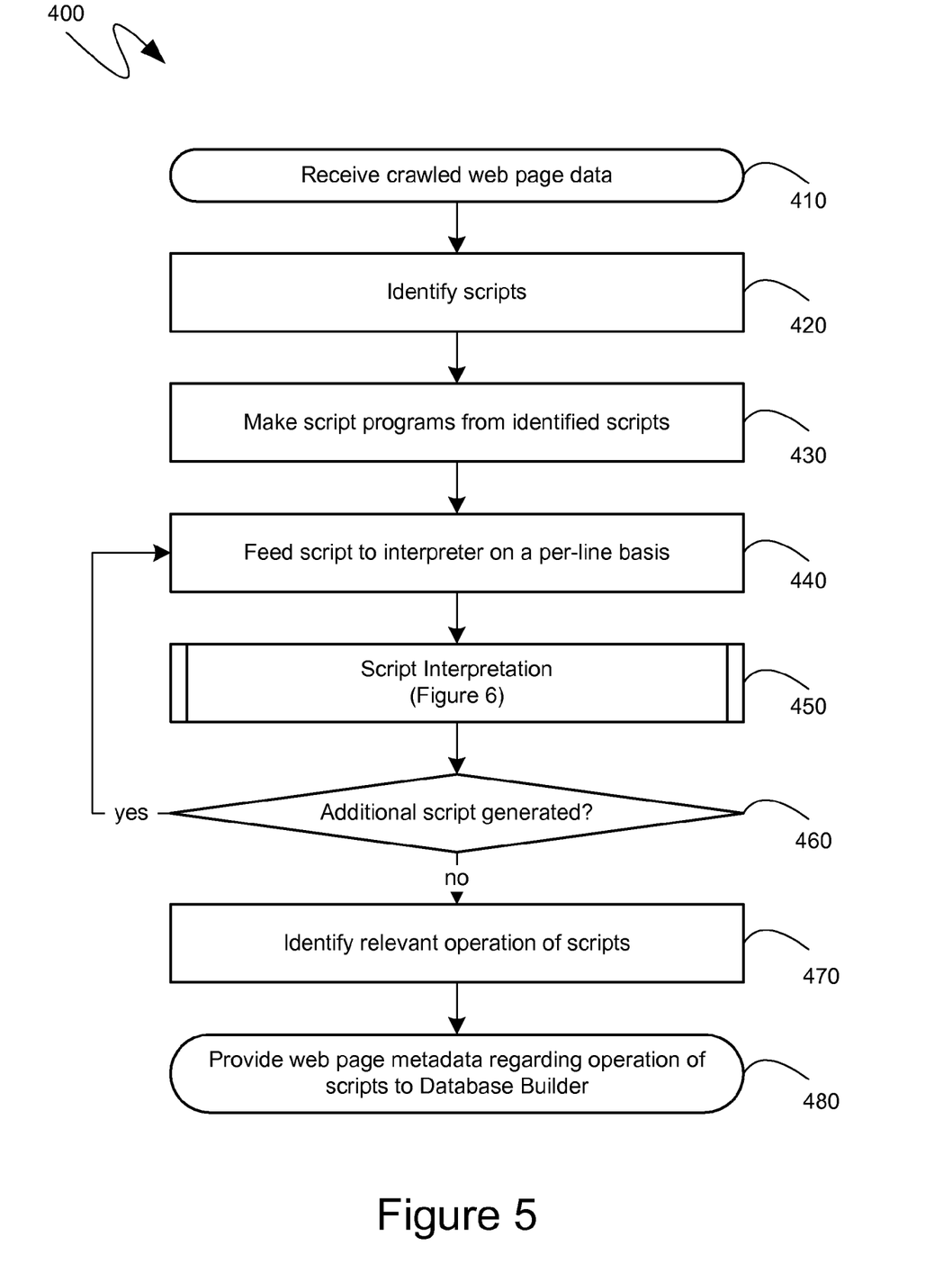
FIG. 5 is an exemplary flow diagram of a script analysis.

The overall flow of an exemplary set of operations that can be performed by components of the script analyzer 44 is illustrated in FIG. 5 as flow 400. Initially, at step 410, web page data that was obtained by the crawler 42 can be received by the script analysis components. Subsequently, any scripts in the web page data can be identified at step 420 and, at step 430, the identified scripts can be encapsulated into script programs. The analysis of the scripts can proceed to step 440, where the scripts can be provided to an interpreter on a line-by-line basis. The interpreter can interpret and execute the provided lines of script at step 450, in a manner described in further detail with reference to FIG. 6.

Subsequent to the interpretation and execution of the scripts, an evaluation can be made, at step 460, regarding any additional script that may have been added, or some prior script that may have been modified, as part of the interpretation of step 450. If appropriate, step 460 can return execution to step 440 to enable the new script to be interpreted and executed at step 450. If no new script was added or modified, then step 460 can enable execution to proceed to step 470 where the overall operation of the scripts is identified. For example, step 470 can determine if the scripts performed a redirection or any other pre-specified activity that may be of interest. Upon making such a determination, the analysis can end at step 480 when information about the scripts, in the form of web page metadata, is provided to the database builder 43.

Figure 6:
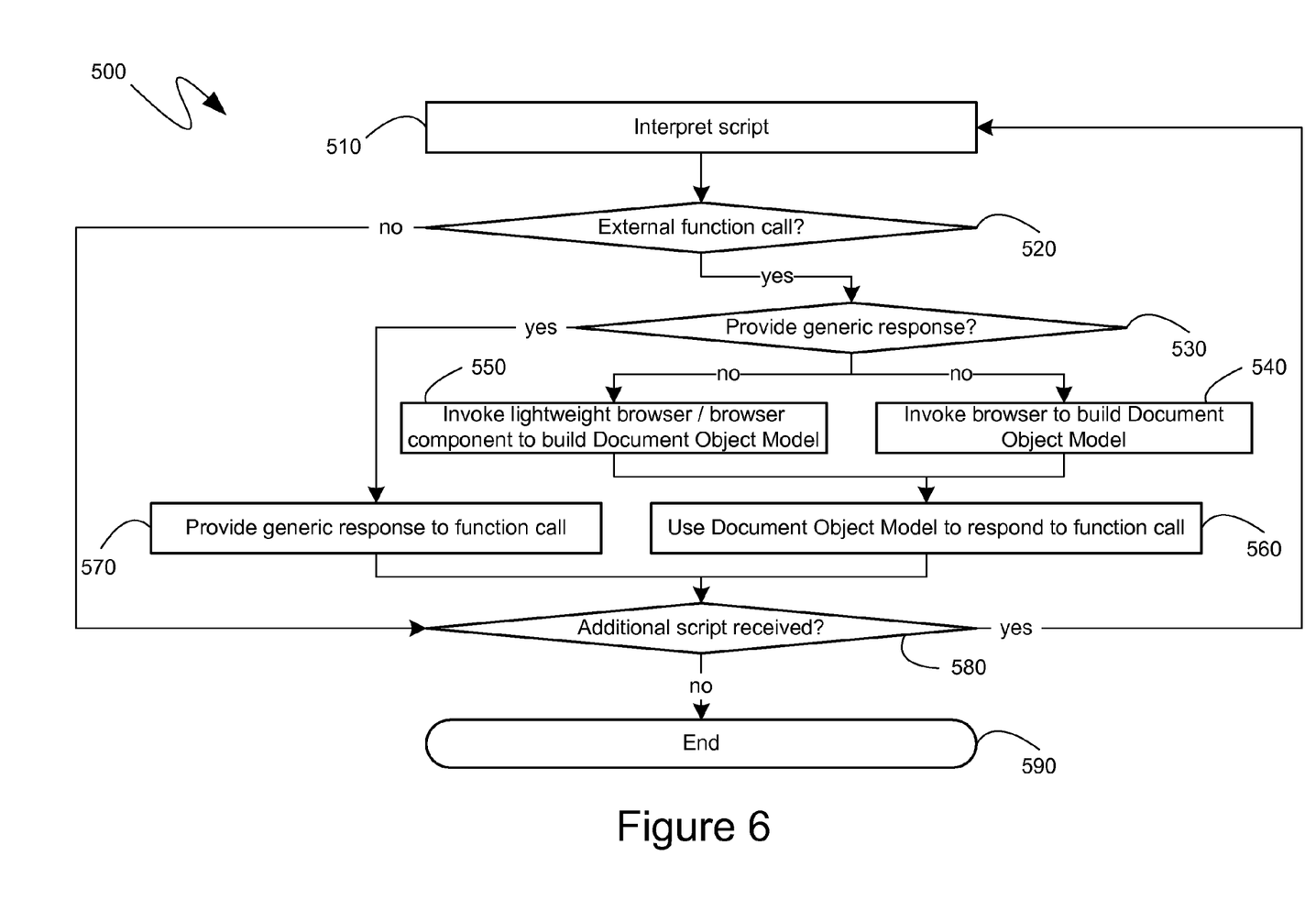
FIG. 6 is an exemplary flow diagram further illustrating the script analysis.

Turning to FIG. 6, flow 500 provides further details regarding the interpretation and execution step 450, describe above. Specifically, script instructions received at step 40 can be interpreted and executed at step 510, as shown in FIG. 6. If such interpretation and execution results in an external function call, as can be determined at step 520, then a further determination at step 530 can be made to assess whether the external function call can be responded to with a generic response, or even with no response at all. If the external function call can be responded to with a generic response, such a response can be provided at step 570. In one embodiment, a generic response can be a response indicating that whatever action was requested by the external function call, that action was performed successfully. In an alternative embodiment, a generic response can be no response at all, since a non-response may trigger script instructions that may be of interest to the script analyzer 44.

If a generic response cannot be provided, as determined by step 530, a browser can be invoked at step 540 to build a DOM. Alternatively, a lightweight browser, or even a browser component that implements only a portion of the overall functionality, can be used to build the DOM at step 550. In either case, once the DOM is built, it can be referenced to provide a more appropriate response to the function call at step 560.

In one embodiment, customization described above with respect to the script function call interceptor 360 can instead be incorporated into the browser invoked at step 540 or the component invoked at step 550. Specifically, a customized browser or component can recognize time-centric function calls from the script and can respond in a manner which avoids delay. Thus, for example, a request to set a timeout can cause the browser or components to immediately proceed as if the timeout has expired. Similarly, delay function calls that wait for a specific event can be dealt with by the browser or browser component as if the specific event had already occurred.

After providing the generic response at step 570, or a more appropriate response at step 560, a determination can be made at step 580 if additional lines of script have been received. If such additional lines have been received, then execution can return to the initial step 510. However, if no additional lines of script have been received, then the interpretation and execution of the script can end at step 590.

As can be seen from the above descriptions, script analysis mechanisms are provided that can, in many cases, perform accurate script analysis without requiring the construction of a document object model or other computationally intensive tasks and are, therefore, suitable for analyzing large numbers of scripts in an efficient manner. In view of the many possible variations of the subject matter described herein, we claim as our invention all such embodiments as may come within the scope of the following claims and equivalents thereto.

We claim:
1. A method for analyzing one or more scripts contained within a document to determine if the one or more scripts perform one or more predefined functions, the method comprising the steps of:
   from the one or more scripts contained within the document, identifying one or more relevant scripts that perform the one or more predefined functions;
   interpreting the one or more relevant scripts;
   intercepting an external function call from the one or more relevant scripts to a document object model of the document while the one or more relevant scripts are being interpreted, wherein the external function call can only be properly responded to with reference to the document object model;
   generating, independently of the document object model and prior to a construction of a relevant portion of the document object model that would have been required to properly respond to the intercepted external function call, a generic response to the intercepted external function call that was directed to the document object model;
   providing the generic response to the intercepted external function call;
   constructing the document object model after the provision of the generic response only if the provision of the generic response did not enable further operation of the relevant scripts; and providing a specific response, obtained with reference to the constructed document object model, to the external function call if the browser was requested to construct the document object model.

2. The method of claim 1 further comprising the steps of: providing a time-centric response, unassociated with a current time, to the external function call if the external function call is a time-centric external function call, the time-centric response causing the one or more relevant scripts to resume operation earlier.

3. The method of claim 1 further comprising the steps of: detecting new script added by the interpreting the one or more scripts; and providing the new script to the interpreting the one or more scripts such that the interpreting the one or more scripts comprises interpreting the new script.

4. The method of claim 1, wherein the browser is a lightweight browser designed for a more limited computing platform.

5. The method of claim 1 further comprising the steps of: aggregating the one or more scripts to represent a first interpretational flow for a first set of conditions; and simulating the first set of conditions.

6. The method of claim 5 further comprising the steps of: aggregating the one or more scripts to represent a second interpretational flow for a second set of conditions, the second set of conditions comprising an alternative conditional result than the first set of conditions; interpreting the aggregating scripts representing the second interpretational flow; and simulating the second set of conditions.

7. The method of claim 1 further comprising the steps of: monitoring the interpreting the one or more scripts for a pre-identified type of action; and actively terminating the interpreting the one or more scripts if the pre-identified type of action is detected.

8. A method for analyzing one or more scripts contained within a document comprising the steps of:
    interpreting the one or more scripts;
    intercepting an external function call from the one or more scripts while the one or more scripts are being interpreted, the external function call making a time-centric request to a document object model of the document such that the time-centric request call can only be properly responded to with reference to the document object model; and
    providing, to the external function call, prior to a construction of a relevant portion of the document object model that would have been required to properly respond to the time-centric request, a time-centric response that is unassociated with a current time and that is independent of the document object model to which the external function call was made, thereby causing the one or more scripts to resume operation earlier;
    wherein the time-centric request waits for at least one of: a pre-specified time period or a user event prior to performing a task; and
    wherein the time-centric response that is unassociated with a current time comprises responding as if at least one of: the pre-specified time or the user event already occurred.

9. The method of claim 8 further comprising the steps of: detecting new script added by the interpreting the one or more scripts; and providing the new script to the interpreting the one or more scripts such that the interpreting the one or more scripts comprises interpreting the new script.

10. The method of claim 8 further comprising the steps of: intercepting another external function call from the one or more scripts while the one or more scripts are being interpreted, the other external function call also directed to the document object model of the document;
    generating, independently of the document object model and prior to the construction of the document object model, a generic response to the intercepted external function call that was directed to the document object model;
    providing the generic response to the other external function call;
    constructing the document object model after the provision of the generic response only if the provision of the generic response did not enable further operation; and
    providing a specific response, obtained with reference to the constructed document object model, to the external function call if the browser was requested to construct the document object model.

11. The method of claim 8 further comprising the steps of: monitoring the interpreting the one or more scripts for a pre-identified type of action; and actively terminating the interpreting the one or more scripts if the pre-identified type of action is detected.

12. One or more computer-readable memory comprising computer-executable instructions for analyzing scripts, the computer-executable instructions directed to steps comprising:
    interpreting one or more scripts;
    intercepting an external function call from the one or more scripts to a document object model of a document while the one or more scripts are being interpreted, wherein the external function call can only be properly responded to with reference to the document object model;
    generating, independently of the document object model and prior to a construction of a relevant portion of the document object model that would have been required to properly respond to the intercepted external function call, a generic response to the intercepted external function call that was directed to the document object model;
    providing the generic response to the intercepted external function call;
    constructing the document object model after the provision of the generic response only if the provision of the generic response did not enable further operation of the relevant scripts; and
    providing a specific response, obtained with reference to the constructed document object model, to the external function call if the browser was requested to construct the document object model.

13. The computer-readable memory of claim 12 further comprising computer-executable instructions for: providing a time-centric response, unassociated with a current time, to the external function call if the external function call is a time-centric external function call, the time-centric response causing the one or more relevant scripts to resume operation earlier.

14. The computer-readable memory of claim 12 further comprising computer-executable instructions for: detecting new script added by the interpreting the one or more scripts; and providing the new script to the interpreting the one or more scripts such that the interpreting the one or more scripts comprises interpreting the new script.

15. The computer-readable memory of claim 12, wherein the browser is a lightweight browser designed for a more limited computing platform.

16. The computer-readable memory of claim 12 further comprising computer-executable instructions for: aggregating the one or more scripts to represent a first interpretational flow for a first set of conditions; and simulating the first set of conditions.

17. The computer-readable memory of claim 16 further comprising computer-executable instructions for: aggregating the one or more scripts to represent a second interpretational flow for a second set of conditions, the second set of conditions comprising an alternative conditional result than the first set of conditions;
   interpreting the aggregating scripts representing the second interpretational flow; and simulating
the second set of conditions.

18. The computer-readable memory of claim 12 further comprising computer-executable instructions for: monitoring the interpreting the one or more scripts for a pre-identified type of action; and actively terminating the interpreting the one or more scripts if the pre-identified type of action is detected.

\* \* \* \* \*